United States Patent
Kochura et al.

(10) Patent No.: US 11,334,887 B2
(45) Date of Patent: May 17, 2022

(54) PAYMENT CARD AUTHENTICATION MANAGEMENT

(71) Applicant: International Business Machines Corporation, Armonk, NY (US)

(72) Inventors: Nadiya Kochura, Bolton, MA (US); Itzhack Goldberg, Hadera (IL); Su Liu, Austin, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/739,176

(22) Filed: Jan. 10, 2020

(65) Prior Publication Data

US 2021/0217008 A1  Jul. 15, 2021

(51) Int. Cl.
| | |
|---|---|
| *G06Q 20/40* | (2012.01) |
| *G06Q 20/38* | (2012.01) |
| *G06Q 20/32* | (2012.01) |
| *G06Q 40/02* | (2012.01) |
| *G06Q 20/10* | (2012.01) |

(52) U.S. Cl.
CPC ............. *G06Q 20/40* (2013.01); *G06Q 20/10* (2013.01); *G06Q 20/32* (2013.01); *G06Q 20/382* (2013.01); *G06Q 40/02* (2013.01)

(58) Field of Classification Search
CPC ....... G06Q 20/32; G06Q 20/04; G06Q 20/385
USPC .......................................................... 705/39
See application file for complete search history.

(56) References Cited

U.S. PATENT DOCUMENTS

| | | | |
|---|---|---|---|
| 8,180,704 B2 | 5/2012 | McQuaide, Jr. | |
| 8,843,757 B2 | 9/2014 | Varadarajan et al. | |
| 9,094,209 B2 | 7/2015 | Zon et al. | |
| 9,426,134 B2 | 8/2016 | Shakkarwar | |
| 9,954,578 B2 | 4/2018 | Ehrensvärd | |
| 10,182,062 B2 | 1/2019 | Aabye | |
| 2007/0291995 A1 | 12/2007 | Rivera | |
| 2008/0319889 A1 | 12/2008 | Hammad | |
| 2009/0156180 A1 | 6/2009 | Slavin | |
| 2011/0184866 A1* | 7/2011 | Shakkarwar | G06Q 20/40 705/44 |
| 2011/0302084 A1 | 12/2011 | Melik-Aslanian | |

(Continued)

OTHER PUBLICATIONS

J. Liu, Y. Xiao, H. Chen, S. Ozdemir, S. Dodie and V. Singh, "A Survey of Payment Card Industry Data Security Standard," in IEEE Communications Surveys & Tutorials, vol. 12, No. 3, pp. 287-303, Third Quarter 2010, doi: 10.1109/SURV.2010.031810.00083. (Year: 2010).*

(Continued)

*Primary Examiner* — Mike Anderson
*Assistant Examiner* — John O Preston
(74) *Attorney, Agent, or Firm* — William H. Hartwell; Isaac J. Gooshaw

(57) ABSTRACT

A payment card system for authorization and authentication is provided. A computing device monitors one or more transactions to detect various security threats comprising one or more accounts. A computing device determines to elevate a security level associated, at least, with one account based, at least, in part, on detection of, at least, one security threat. A computing device generates at least one temporary personal identification number based, at least, on determination to elevate a security level associated, at least, with one account.

20 Claims, 7 Drawing Sheets

(56) References Cited

U.S. PATENT DOCUMENTS

| | | | |
|---|---|---|---|
| 2012/0143754 A1 | 6/2012 | Patel | |
| 2013/0117822 A1* | 5/2013 | Soulez | G07F 19/20 |
| | | | 726/4 |
| 2014/0074725 A1 | 3/2014 | Belamant | |
| 2014/0122340 A1 | 5/2014 | Flitcroft | |
| 2020/0167469 A1* | 5/2020 | Kochura | G06F 21/554 |

OTHER PUBLICATIONS

J. Téllez Isaac and Z. Sherali, "Secure Mobile Payment Systems," in IT Professional, vol. 16, No. 3, pp. 36-43, May-Jun. 2014, doi: 10.1109/MITP.2014.40. (Year: 2014).*

F. S. Park, C. Gangakhedkar and P. Traynor, "Leveraging Cellular Infrastructure to Improve Fraud Prevention," 2009 Annual Computer Security Applications Conference, 2009, pp. 350-359, doi: 10.1109/ACSAC.2009.40. (Year: 2009).*

Chartier, D.; "Hackers used packet sniffers to filch credit card data"; Ars Technica, May 13, 2008, 3 pages, <https://arstechnica.com/uncategorized/2008/05/hackers-used-packet-sniffers-to-filch-credit-card-data/>.

Mahmud, T.; "Predicting Credit Card Fraud"; Austin Big Data AI; Mar. 14, 2018, 22 pages, <https://dataplatform.cloud.ibm.com/analytics/notebooks/v2/9cecd833-2bfc-4be5-8e2e-75e0b0892d5d/view?access_token=9d0947969ba083210ef1958fba43c952bfc00c823f1f4042d679c7b9f1b1f7a4>.

Mell et al., "The NIST Definition of Cloud Computing", NIST, U.S. Department of Commerce, Special Publication 800-145, Sep. 2011, 7 pages.

Tressler, C.; "Watch out for card skimming at the gas pump"; Federal Trade Commission, Consumer Information; Aug. 7, 2018; 3 pages, <https://www.consumer.ftc.gov/blog/2018/08/watch-out-card-skimming-gas-pump>.

* cited by examiner

PAYMENT CARD AUTHENTICATION MANAGEMENT

BACKGROUND OF THE INVENTION

The present invention relates generally to the field of payment card services, and more particularly to authorization and authentication methods and systems.

The proliferation for payment card protection has become increasingly prevalent in society. Payment card companies often assist consumers and businesses in protecting financial information by issuing replacement cards in an efficient manner and by canceling the continued use of the previous payment card.

SUMMARY

Embodiments of the present invention provide a method, system, and program product for payment card system for authorization and authentication.

A first embodiment encompasses a method for managing an autonomous computing system through an internet of things (IoT) protocol. One or more processors monitor one or more transactions to detect various security threats compromising one or more accounts. The one or more processors determine to elevate a security level associated, at least, with one account based, at least, in part, on detection of, at least, one security threat. The one or more processors generate at least one temporary personal identification number based, at least, on determination to elevate a security level associated, at least, with one account.

A second embodiment encompasses a computer program product for managing an autonomous computing system through an internet of things (IoT) protocol. The computer program product includes one or more computer-readable storage media and program instructions stored on the one or more computer-readable storage media. The program instructions include program instructions to monitor one or more transactions to detect various security threats compromising one or more accounts. The program instructions include program instructions to determine whether to elevate a security level associated, at least, with one account based, at least, in part, on detection of, at least, one security threat. The program instructions include program instructions to generate at least one temporary personal identification number based, at least, on determination to elevate a security level associated, at least, with one account.

A third embodiment encompasses a computer system for managing an autonomous computing system through an internet of things (IoT) protocol. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to monitor one or more transactions to detect various security threats compromising one or more accounts. The program instructions include program instructions to determine whether to elevate a security level associated, at least, with one account based, at least, in part, on detection of, at least, one security threat. The program instructions include program instructions to generate at least one temporary personal identification number based, at least, on determination to elevate a security level associated, at least, with one account.

DETAILED DESCRIPTION

Figure 1:
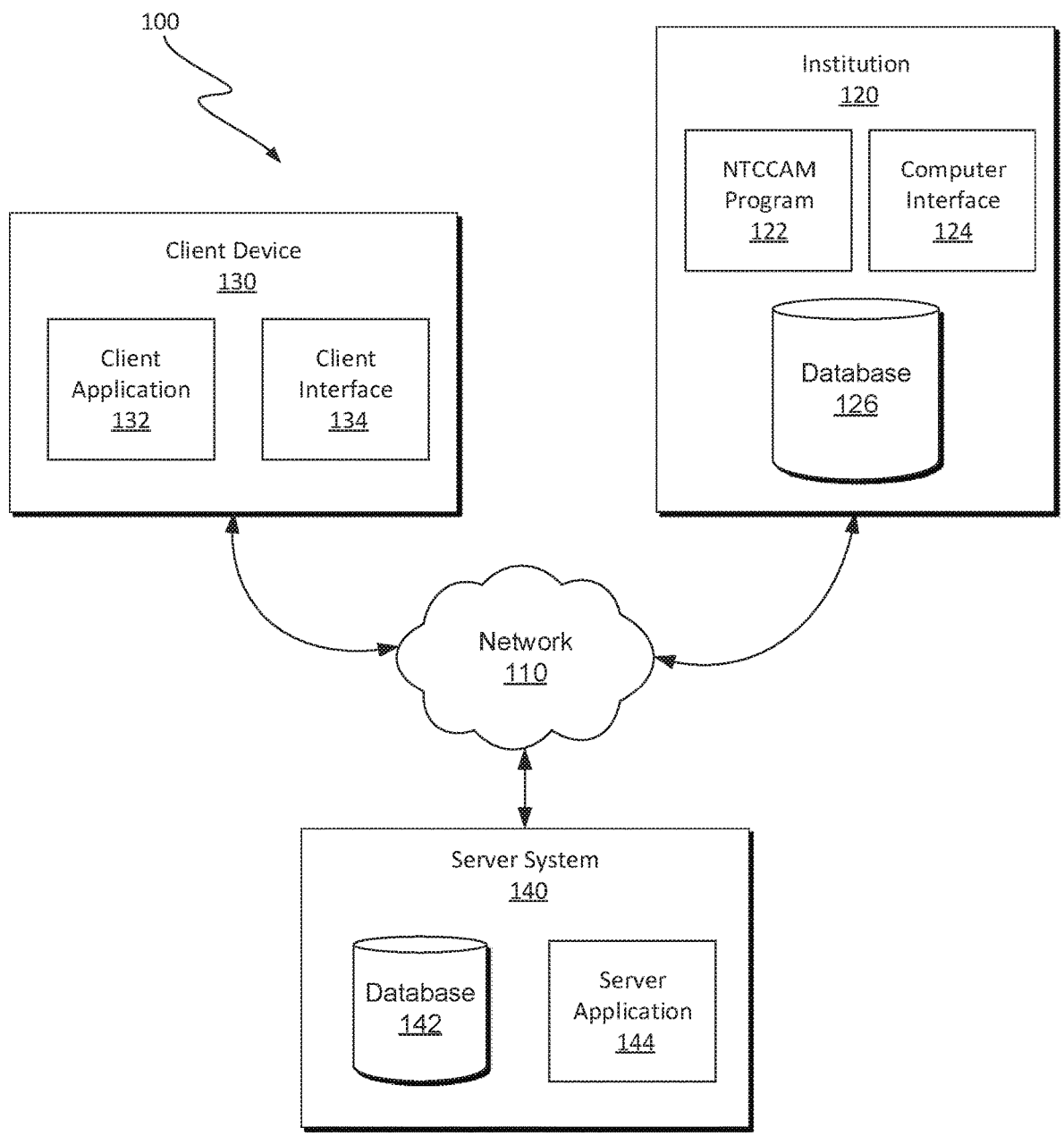
FIG. 1 is a functional block diagram illustrating a computing environment, in which a system for payment card authorization and authentication is managed, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to payment card protection are known, these solutions may be inadequate to provide the necessary security for an account owner's payment card because these solutions often require the cancellation of the account owner's payment card resulting in loss of function and use of the card while a replacement card is sent through the mail and/or post. Further, the account owner's financial information can still be obtained and/or accessed through the loss of theft.

In some embodiments, the security measures that are in place, when an account that has been compromised, are ineffective to prevent or track the individuals that compromised an account. Generally, the security measures involve freezing the entirety of the activity for an account and an associated payment card. Where the individuals who are responsible for the compromised account may abandon subsequent use of a payment card of a compromised account and no further action will take effect. The present invention leverages the ability to allow a payment card to be active without freezing the compromised account. Further, the present invention recognizes that the account owner will subsequently need access to their account, regardless of the security threats. The present invention provides the ability for the account owner access to their account during the time period of the security threat and allows for the individuals responsible for the security threat to be tracked via their subsequent use of a payment card associated with the compromised account.

Embodiments of the present invention recognize that use of an account owner's payment card is necessary in today's society, as well as securing the financial information of the account owner, without interrupting the daily functions of the account owner. Commercial businesses, banks, and institutions often require confirmation that the account owner, with whom they conduct business with, are the rightful and proper users of the payment card associated with the account.

In general, authentication is the method of verifying the identity of the user, as an example, by username and static password or personal identification number (PIN). Static password and/or PIN are the most popular authentication method available, however, if an account is compromised the payment card number and PIN are compromised, as well.

Temporary, pseudo-generated PIN replacements while an account has been compromised offer a more unique and secure solution for the authentication and use of a payment card while the account has been compromised. The present invention provides a more effective system for revoking use of a payment card using the original PIN and providing a temporary PIN that can be utilized in tandem with the payment card and/or account during the time period that a payment card and/or account has been compromised.

In one embodiment, no-interrupted credit card authentication management (hereinafter referred to as "NTCCAM") NTCCAM program 122 monitors one or more transactions to detect various security threats compromising one or more accounts. NTCCAM program 122 determines to elevate a security level associated, at least, with one account based, at least, in part, on detection of, at least, one security threat. NTCCAM program 122 generates at least one temporary personal identification number based, at least, on determination to elevate a security level associated, at least, with one account.

In one embodiment, NTCCAM program 122 receives at least one dedicated channel associated with, at least, one account. NTCCAM program 122 communicates one or more various data utilizing the dedicated channel.

In one embodiment, NTCCAM program 122 monitors the one or more transactions associated with the one or more accounts. NTCCAM program 122 receives the one or more transactions associated with one or more payment cards. NTCCAM program 122 analyzes the one or more transactions.

In one embodiment, NTCCAM program 122 analyzes the one or more transactions for one or more security threats. NTCCAM program 122 identifies one or more security threats associated with, at least, one account. In response to identifying one or more security contexts associated with, at least, one account, NTCCAM program 122 determines whether to elevate the security level of the, at least, one account associated with the one or more identified security threats.

In one embodiment, NTCCAM program 122 executing a security protocol associated with (i) the one or more identified security threats and (ii) at least one compromised account. NTCCAM program 122 generates a temporary personal identification number associated with the compromised account. NTCCAM program 122 communicates the temporary personal identification number to an account owner associated with the compromised account utilizing the dedicated channel associated with the compromised account.

In one embodiment, in response to communicating the temporary personal identification number to an account owner associated with the compromised account utilizing the dedicated channel associated with the compromised account, NTCCAM program 122 authorizes one or more transactions utilizing the temporary personal identification number. NTCCAM program 122 monitors the compromised account for one or more transactions associated with the temporary personal identification number. NTCCAM program 122 identifies the one or more transactions associated with (i) the compromised account and (ii) the temporary personal identification number. In response to identifying the one or more transactions associated with (i) the compromised account and (ii) the temporary personal identification number, NTCCAM program 122 analyzes the one or more transactions.

In one embodiment, NTCCAM program 122 identifies one or more security threats associated with the compromised account. NTCCAM program 122 executes a tracking module associated with (i) the compromised account and (ii) a payment card. NTCCAM program 122 generates an alert system. NTCCAM program 122 communicates an alert system utilizing the dedicated channel to the account owner.

The present invention will now be described in detail with reference to the Figures.

FIG. 1 is a functional block diagram illustrating a computing environment, generally designated 100, in accordance with one embodiment of the present invention. Computing environment 100 includes institution 120, client device 130, and server system 140 connected over network 110. Institution 120 includes no-interrupted credit card authentication management (hereinafter referred to as "NTCCAM") program 122, computer interface 124, and database 126. Client device 130 includes client application 132 and client interface 134. Server system 140 includes database 142 and server application 144. NTCCAM program 122 and client application 132 include program instructions to perform the functions of the invention as described herein.

In various embodiments of the present invention, institution 120 is as computing device that can be a standalone device, a server, a laptop computer, a tablet computer, a netbook computer, a personal computer (PC), or a desktop computer. In another embodiment, institution 120 represents a computing system utilizing clustered computers and components to act as a single pool of seamless resources. In general, institution 120 can be any computing device or a combination of devices with access to client device 130, server system 140, and network 110 and is capable of executing NTCCAM program 122. Institution 120 may include internal and external hardware components, as depicted and described in further detail with respect to FIG. 1.

In this exemplary embodiment, NTCCAM program 122 and computer interface 124 are stored on database 126. However, in other embodiments, NTCCAM program 122 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between institution 120, client device 130 and server system 140, in accordance with a desired embodiment of the present invention.

In various embodiments of the present invention, client device 130 is a computing device that can be a standalone device, a server, a laptop computer, a tablet computer, a netbook computer, a personal computer (PC), a desktop computer, a smartwatch, a smart phone, or a cellular device. In another embodiments, client device 130 represents a computing system utilizing clustered computers and components to act as a single pool of seamless resources. In general, client device 130 may include internal and external hardware components, as depicted and described in further detail with respect to FIG. 1.

In this exemplary embodiment, client application 132 and client interface 134 are stored on client device 130. However, in some embodiments, client application 132 may be stored externally and accessed through a communication network, such as network 110.

In various embodiments of the present invention, server system 140 is a storage system that includes database 142 and server application 144. Server system 140 may include one or more of, but is not limited to, computing devices, servers, server-clusters, web-servers, databases and storage devices. Server system 140 operates to communicate with institution 120 and client device 130 and other various computing devices (not shown) over a network, such as network 110. For example, server system 140 communicates with NTCCAM program 122 to transfer data between, but is not limited to, database 126, client device 130 and various other databases (not shown) that are connected to network 110. In general, server system 140 can be any computing device or a combination of devices that are communicatively connected to a local IoT network, i.e., a network comprised of various computing devices including, but are not limited to, institution 120 and client device 130, to provide the functionality described herein. Server system 140 can include internal and external hardware components as described with respect to FIG. 7. The present invention recognizes that FIG. 1 may include any number of computing devices, servers, databases and/or storage devices, and the present invention is not limited to only what is depicted in FIG. 1. As such, in some embodiments, some or all of the features and functions of server system 140 are included as part of institution 120, client device 130 and/or another computing device. Similarly, in some embodiments, some of the features and function of institution 120 are included as part of server system 140 and/or another computing device.

Additionally, in some embodiments, server system 140 represents a cloud computing platform. Cloud computing is a model or service delivery for enabling convenient, on demand network access to a shared pool of configurable computing resources (e.g., networks, network bandwidth, servers, processing, memory, storage, applications, virtual machines and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model; and can be implemented as various deployment models including as a private cloud, a community cloud, a public cloud and a hybrid cloud.

FIG. 1 is a functional block diagram illustrating a computing environment in which a system for authentication modes and varying levels of security and personal identification numbers (PINS) are utilized, in accordance with an embodiment of the present invention. For example, FIG. 1 is a functional block diagram illustrating computing environment 100 that includes institution 120, client device 130, and server system 140, which are communicatively connected via network 110. In general, embodiments recognize that a variety of institutions, financial or otherwise, may provide PINS to clients and that a variety of requests from a client may initiate the request and generation by an institution, to a given client for authentication and/or permission granting purposes. Institution 120 represents various elements of an information technology infrastructure of an entity or organization that utilizes PINS control policies to manage commercial transaction(s). Institution 120 includes NTCCAM program 122 that executes, at least in part, to manage access to institution 120, and database 126 stores data (i.e., biometric data, application data, logic data, metadata, etc.). Institution 120 can include additional elements for provisioning and/or managing client device 130 and server system 140.

NTCCAM program 122 is depicted in FIG. 1 for illustrative simplicity, institution 120, however, can include any number of logics that are managed in accordance with NTCCAM program 122. In general, NTCCAM program 122 represents a physical or virtual resource to which the entity or organization represented by institution 120 wishes to manage access. In some embodiments, NTCCAM program 122 represents information and NTCCAM program 122 manages the ability to view the information. In other embodiments, NTCCAM program 122 represents code that provides an ability to take specific action with respect to another physical or virtual resource and NTCCAM program 122 manages the ability to take such actions. In yet other embodiments, NTCCAM program 122 represents control over a physical or virtual resource and NTCAAM program 122 manages the ability to use and modify the resource. NTCCAM program 122 can also represent any combination of the aforementioned elements. To illustrate various aspects of the present invention, examples of NTCCAM program 122 are presented in which NTCCAM program 122 represents one or more of: a commercial transaction, a financial transaction, a authentication transaction, a well-being monitoring transaction, or a user profile transaction, are presented, but embodiments of NTCCAM program 122 are not limited thereto. Embodiments of the present invention recognize that NTCCAM program 122 may include other forms of transactions that are known in the art.

In the embodiment depicted in FIG. 1, NTCCAM program 122 utilizes, at least in part, data stored on database 126 to manage access to institution 120 in response to an authentication request received from client device 130 (i.e., from a user of client device 130, alternatively referred to herein as "requestor"). More specifically, NTCCAM program 122 defines a resource hierarchy that represents various authentications and that associates certain authentications with certain users associated with client device 130.

In various embodiments of the present invention, server system 140 represents a one or more data sources that store and communicate I/O with institution 120. In some embodiments, server system 140 represents a single data source that collects and stores I/O between the account owner and the single data source. In these various embodiments, I/O can include, but is not limited to, (i) one or more transactions between the account owner and the single data source wherein the account owner utilized, at least, one payment card to facilitate the transaction, and/or (ii) an account owner established a user profile with the single data source and storing personal identifying information on database 142. In various embodiments, institution 120 communicates with server system 140 and requests I/O regarding the various transactions between the account owner and the single data source and institution 120 receives I/O from server system 140. In an alternative embodiment, server application 144 executing on server system 140 analyzes the I/O between an account owner and server system 140 and identifies the institution (e.g., institution 120) that the account owner is, at least in part, associated with. Server application 144 retrieves I/O and communicates the I/O to institution 120 based, at least in part, on program instructions communicated by institution 120.

In some embodiments of the present invention, server system 140 represents a network that includes one or more data sources that store and communicate I/O with institution 120. In some embodiments, server system 140 represents a single data source that collects and stores I/O between the account owner and one or more data sources. In these various embodiments, I/O can include, but is not limited to, (i) one or more transactions between the account owner and the one or more data sources wherein the account owner utilized, at least, one payment card to facilitate the transaction, and/or (ii) an account owner established a user profile with the one or more data sources and stores personal identifying information on database 142. In various embodiments, institution 120 communicates with server system 140 and requests I/O regarding the various transactions between the account owner and the one or more data sources and institution 120 receives I/O from server system 140. In an alternative embodiment, server application 144 executing on server system 140 analyzes the I/O between an account owner and server system 140 and identifies the institution (e.g., institution 120) that the account owner is, at least in part, associated with. Server application 144 retrieves I/O and communicates the I/O to institution 120 based, at least in part, on program instructions communicated by institution 120.

In various embodiments depicted in FIG. 1, database 126 operates to store data as a security provider for institution 120 and client device 130. More specifically, database 126 stores information that includes, but is not limited to, (i) biometric data of a user, (ii) personal identifying information, (iii) financial information, (iv) application logic, and (v) at least program code to generate a temporary pin number and/or password. To illustrate various aspects of the present invention, examples of a payment card authentication management system, are presented. However, embodiments of a payment card authentication management system are not limited hereto. In various embodiments, a payment card authentication management system encompasses any computing resource, or combination of computing resources, that are configured to carry out authentication of a temporary pin using the processes described herein. Embodiments of the present invention recognize that computing environment 100 may include other forms of computing devices that are known in the art.

In the embodiment depicted in FIG. 1, institution 120 represents, but is not limited to, an organization and/or entity, and client device 130 represents, but is not limited to, a user device that is an account holder of institution 120. The present invention recognizes that in various embodiments a user of client device 130 has possession of, at least, one payment card from institution 120 with an associated (i) user profile, (ii) user login information, and (iii) PINS. In various embodiments, a user misplaces and/or has the payment card stolen from their possession. In these embodiments, a user generates a NTCCAM request and utilizes client application 132 executing on client device 130 to communicate the NTCCAM request to NTCCAM program 122.

In various embodiments, NTCCAM program 122 receives a NTCCAM request from client device 130. NTCCAM program 122 analyzes the NTCCAM request and identifies (i) one or more payment cards and (ii) one or more security contexts associated with the one or more payment cards. In some embodiments, the NTCCAM request represents one or more security contexts that include, but are not limited to, suspect activity, purchases made in a foreign location, large withdrawal at a remote location (i.e., that may be far and removed from the account owner's location), login to online account from an unidentified computing device (i.e., not authorized by the account owner), purchases that are not analogous to the account owner's frequent purchases, and lost or stolen payment card reported by account owner.

In some embodiments of the present invention, the account owner establishes and communicates to institution 120 a dedicated channel so that institution 120 can communicate one or more Cpins and/or various communications to the account owner. In various embodiments, Cpins represents a one-time temporary PIN number for authenticating an account. In various embodiments, an account owner establishes a dedicated channel that includes, but is not limited to, client device 130, wherein client device 130 represents, but is not limited to, a mobile device, smart phone, or any computing device capable of receiving one or more Cpins and various communications from NTCCAM program 122 regarding the owner's account. The present invention recognizes that a dedicated channel represents any virtual and/or physical device that is capable of receiving one or more Cpins and various communications from NTCCAM program 122. The virtual and/or physical device includes, but is not limited to, social media channels, ATMs, or various other virtual and/or physical devices that the account owner utilizes and communicates to institution 120.

In some embodiments, NTCCAM program 122 analyzes a NTCCAM request from a user of client device 130 (e.g., account owner) and requests that a temporary pin number (e.g., Cpin) be generated for a transient period of time, until a new payment card has been received and activated by the account owner, for the account owner's current payment card. Additionally, NTCCAM program 122 further analyzes the request and identifies that the NTCCAM request includes a request from the account owner that a new payment card be created and sent to the account owner. In various embodiments, based, at least in part, on the NTCCAM request, NTCCAM program 122 generates a temporary pin number (e.g., Cpin) and communicates the Cpin with instructions to the account owner through a dedicated channel (e.g., client device 130). In some embodiments, NTCCAM program 122 communicates the Cpin and instructions to client application 132 with further program instructions to populate the Cpin and instructions on client interface 134 to communicate the Cpin and instructions to the account owner (e.g., user of client device 130). The present invention recognizes that one or more Cpins may be generated by NTCCAM program 122 and communicated to an account owner. Additionally, the present invention recognizes that each individual Cpin generated is wholly distinct and unique from any other Cpin that is generated for one or more account owners.

In various embodiments of the present invention, NTCCAM program 122 communicates a Cpin and instructions to a user of client device 130 (e.g., account owner) for the current payment card based, at least in part, on a NTCCAM request. In some embodiments, NTCCAM program 122 generated the Cpin to be used by an account owner for a transient period of time. The present invention recognizes that a transient period of time is a period of time which includes, but is not limited to, using the Cpin for a specified period of time (e.g., 1 day, 2 days, 7 days, etc.) and/or until the account owner receives a new payment card and activates the new payment card. Additionally, in various embodiments, NTCCAM program 122 identifies when the specified period of time runs out and/or a new payment card is activated and NTCCAM program 122 terminates the use of the Cpin. In some embodiments, based, at least in part, on a new payment card and/or a specified period of time running out, NTCCAM program 122 reinstates the initial PIN established by an account owner for the use of the new payment card and/or the current payment card. In some embodiments, NTCCAM program 122 monitors the subsequent use of the Cpin after NTCCAM program 122 has terminated the Cpin.

In the embodiment depicted in FIG. 1, NTCCAM program 122 is a well-being and monitors the transactions of one or more payments cards associated with various account owners with an organization (i.e., institution 120). In various embodiments, NTCCAM program 122 monitors the various transactions of one or more payment cards associated with an account owner (e.g., user of client device 130) with institution 120. As discussed above, an account owner establishes and communicates a dedicated channel in which NTCCAM program 122 can communicate one or more Cpins and/or various communications to an account owner (e.g., user of client device 130). In some embodiments, NTCCAM program 122 identifies a security context and NTCCAM program 122 analyzes the security context to determine whether elevating the security level for the, at least, one payment card for an account owner. If, in some embodiments, NTCCAM program 122 determines that heightening the security level is necessary, NTCCAM program 122 generates a NTCCAM request and communicates the request to an account owner through a dedicated channel, established by an account owner, communicating to an account owner that NTCCAM program 122 is suspending the current PIN associated, at least, with the one payment card and NTCCAM program 122 is generating a Cpin that is, at least, associated with the one payment card.

In various embodiments of the present invention, NTCCAM program 122 monitors various transactions associated with one or more payments cards of one or more account owners. In some embodiments, NTCCAM program 122 identifies one or more security contexts with, at least, one payment card associated with, at least, one account owner. NTCCAM program 122 retrieves the various transactions associated with the one payment card and analyzes the various transactions to determine whether the security contexts identified reach a threshold value that warrants elevating the security level of the one payment card. In some embodiments, NTCCAM program 122 determines that the security contexts associated, at least, with the various transactions, reach a threshold value and, additionally determines, that the security level for the one payment card should be elevated from normal to heightened security level. In some embodiments, NTCCAM program 122 executes a security protocol and elevates the one payment card to a heightened security level and notifies the account owner through the dedicated channel. NTCCAM program 122 based, at least in part, on the elevation to a heightened security level, generates a Cpin and instructions and communicates the Cpin and instructions through the dedicated channel to client application 132 with program instructions instructing client application 132 to notify the account owner (e.g., user of client device 130) by populating the Cpin and instructions on client application 134.

In some embodiments, NTCCAM program 122 communicates, at least, one Cpin and instructions to an account owner (e.g., user of client device 130) that include, but are not limited to, (i) the rationale for generating a Cpin based, at least, on the analyzation of the security context, (ii) the length in which the Cpin will be active for, and (iii) the anticipated arrival date of the new payment card. NTCCAM program 122 further instructs the account owner to utilize the Cpin in subsequent transaction as a placeholder for the current pin until the new payment card arrives and/or until the Cpin expires after a specified period of time, as discussed above.

In various embodiments, NTCCAM program 122 continues to monitor the various transactions of the one payment card while the account owner utilizes the Cpin. NTCCAM program 122 actively monitors the various transaction for additional security contexts that would compromise the security of the one payment card. In various embodiments, NTCCAM program 122 monitors the one payment card while the Cpin is active and does not identify any security contexts that would compromise the security of the one payment card. In some embodiments, NTCCAM program 122 identifies one or more security contexts associated with the, at least, one payment card while the Cpin is active. NTCCAM program 122 in response to identifying one or more security contexts associated with the, at least, one payment card while the Cpin is active, analyzes the various transaction to determine whether NTCCAM program 122 determines that the one or more security contexts would compromise the security of the, at least, one payment card. In some embodiments, NTCCAM program 122 determines that the one or more security contexts do not reach a threshold value that would compromise the security of the, at least, one payment card. In various embodiments, NTCCAM program 122 determines that the one or more security contexts would compromise the security of the, at least, one payment card. In response to determining that the one or more security contexts would compromise the security of the, at least, one payment card, NTCCAM program 122 generates, at least, a second Cpin and instructions and communicates the Cpin and instructions to the account owner through the dedicated channel, as discussed above.

NTCCAM program 122 communicates the Cpin and instructions to client application 132 with program instructions to communicate the Cpin and instructions to the account owner by populating the Cpin and instructions on client interface 134. Additionally, NTCCAM program 122 informs the account owner based, at least in part, on the communications of the second instructions, to discontinue use of the, at least, first Cpin and utilize the second Cpin for the, at least, one payment card until (i) the, at least, second Cpin expires after a specified period of time and/or (ii) the new payment card arrives, as discussed above.

In various embodiments of the present invention, the account owner receives a new payment card and activates the new payment card with institution 120. In some embodiments, the account owner utilizes client application 132 to activate the new payment card with institution 120, wherein NTCCAM program 122 receives an activation request and authenticates the new payment card. In various embodiments, NTCCAM program 122 communicates an NTCCAM notification to client application 132 with program instructions instructing client application 132 to communicate the account owner (e.g., user of client device 130) of the authentication of the new payment card and to discontinue use of the active Cpin and to continue use of the current PIN. In some embodiments, based, at least in part, on the activation and authentication of the new payment card, NTCCAM program 122 demotes the heightened security level to normal security level for the, at least, one payment card.

Figure 2:
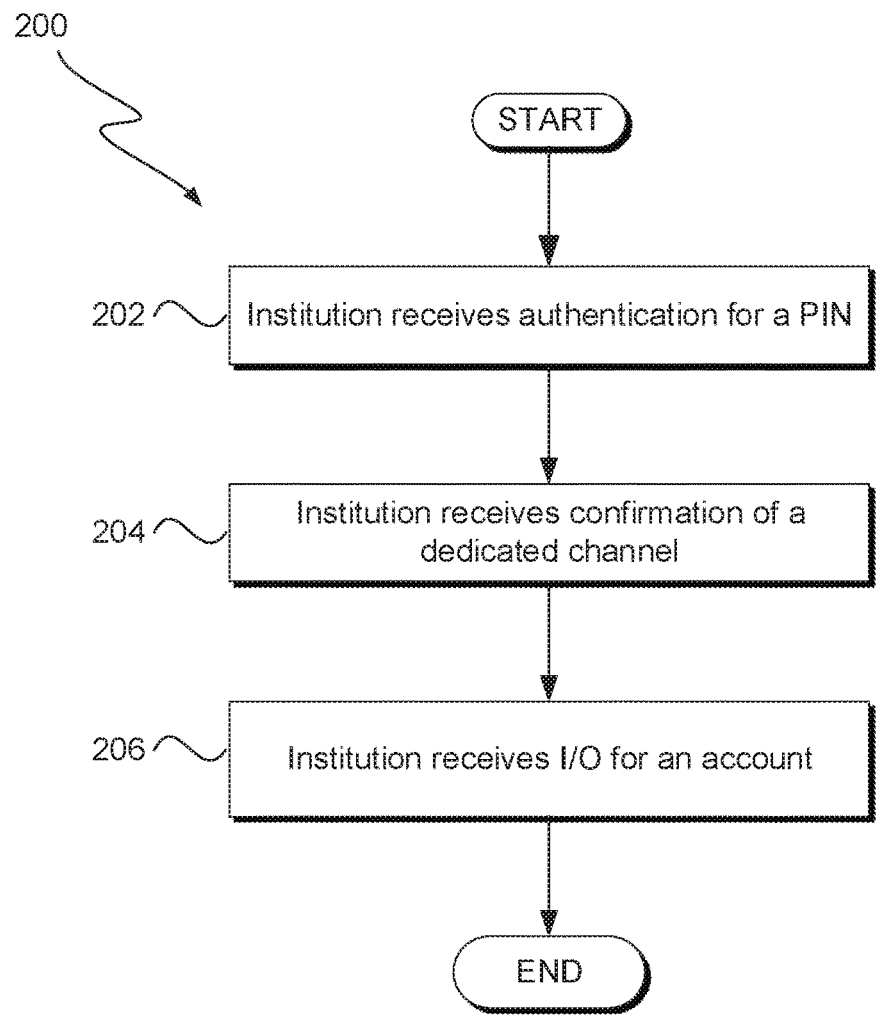
FIG. 2 illustrates operational processes of a system for a payment card to establish a dedicated channel, on a computing device within the environment of FIG. 1, in accordance with an exemplary embodiment of the present invention.

FIG. 2 is a flowchart depicting operations for executing a security system for a no-interrupted payment card authentication system in computing environment 100, in accordance with an illustrative embodiment of the present invention. More specifically, FIG. 2 depicts combined overall operations, 200, of NTCCAM program 122 executing on institution 120, to manage confidential and personal information stored on database 126 of institution 120. In some embodiments, however, operations 200 represents logical operations of NTCCAM program 122, wherein interactions between client application 132 of client device 130 and server application 144 of server system 140 represent interactions between logical units executing on institution 120. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, in flowchart 200, can be terminated at any operations. Additionally, any operation of flowchart 200, can be resumed at any time.

In operation 202, NTCCAM program 122 receives authentication for a PIN from an account owner (e.g., user of client device 130) that is associated, at least, with one payment card that is utilized by the account owner. In various embodiments, the account owner, upon receiving a payment card from institution 120, establishes a PIN that is to be associated with the received payment card. The present invention recognizes that the account owner utilizes this PIN to authorize transactions made with the payment card. One having ordinary skill in the art would understand that a PIN includes, but is not limited to, a series of characters and/or numerics that are oriented in a specific order established by the account owner.

In operation 204, NTCCAM program 122 receives confirmation of a dedicated channel from the account owner (e.g., user of client device 130). In various embodiments, the account owner establishes a dedicated channel, as discussed above, which allows institution 120 to communicate various confidential communications to the account that include, but is not limited to, one or more temporary Cpins. NTCCAM program 122 stores the information regarding the dedicated channel established by the account owner on database 126. In various embodiments of the present invention, the account owner accesses the dedicated through client device 130 but is not limited thereto. The present invention recognizes that a dedicated channel represents any virtual and/or physical device that is capable of receiving one or more Cpins and various communications from NTCCAM program 122. The virtual and/or physical device includes, but is not limited to, social media channels, ATMs, or various other virtual and/or physical devices that the account owner utilizes and communicates to institution 120.

In operation 206, institution 120 receives I/O from, at least, server system 140 and/or various other computer systems (not shown). In various embodiments of the present invention, NTCCAM program 122 receives I/O (e.g., one or more transactions) from server system 140 that is associated, at least in part, with various accounts established with institution 120. In one embodiments and example, NTCCAM program 122 receives I/O for account A associated with account owner A who is a member of institution 120. The I/O that NTCCAM program 122 receives includes, but is not limited to, various transactions that account owner A completes with one or more data sources within server system 140. NTCCAM program 122 stores this I/O on database 126. In various embodiments, NTCCAM program 122 receives I/O based, at least in part, on various transactions that are completed using a payment card associated with account A. In some embodiments, one or more transactions are completed fraudulently without the authorization of account owner A. NTCCAM program 122 actively receives I/O associated with various transactions and stores the I/O on database 126 for subsequent analyzation to determine whether the security of various accounts have been compromised, wherein NTCCAM program 122 executes a security context protocol and generates one or more temporary Cpins and communicates the one or more temporary Cpins to various account owners whose accounts may have been compromised.

Figure 3:
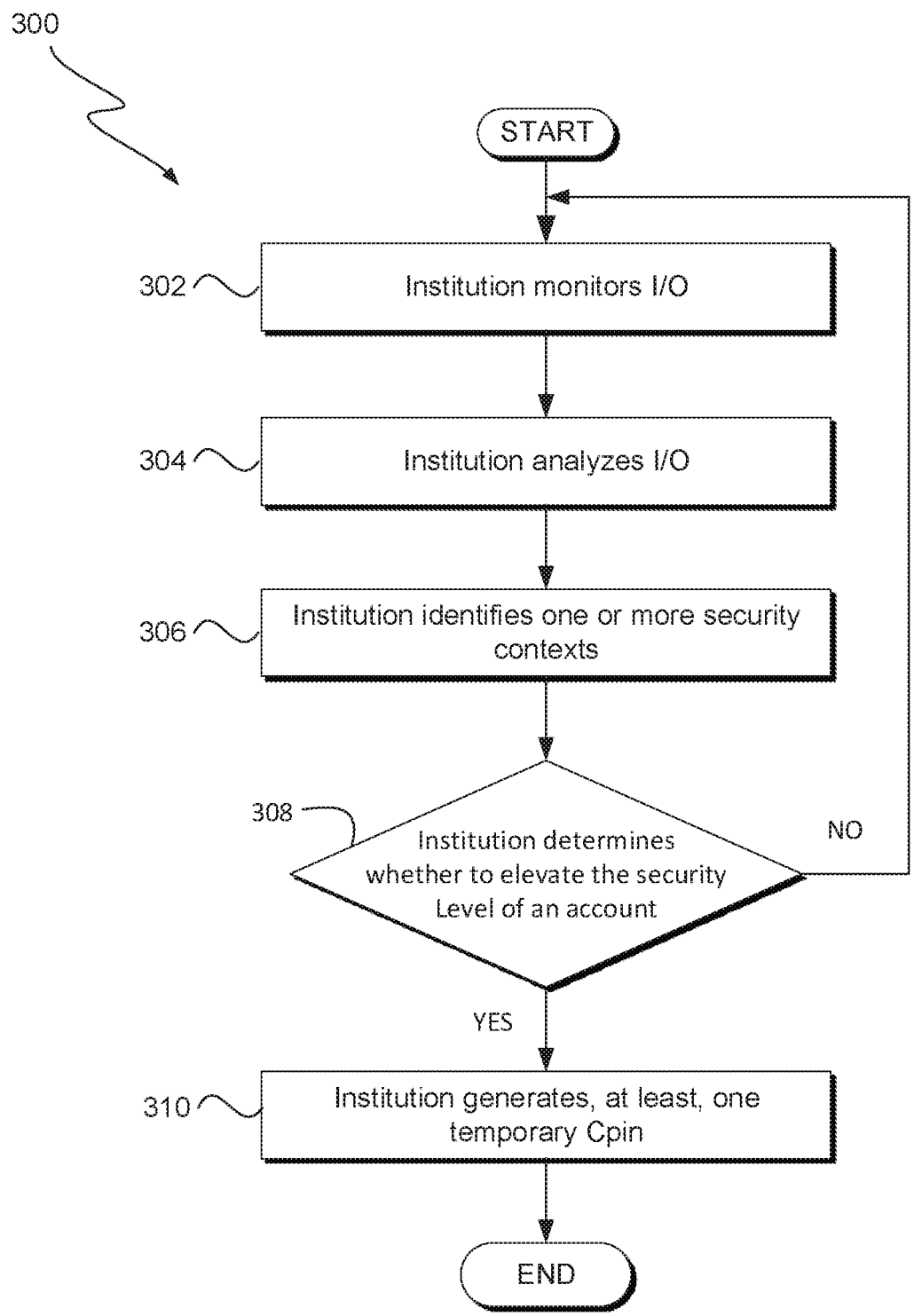
FIG. 3 illustrates operational processes of a system for a payment card to identify various security threats, on a computing device within the environment of FIG. 1, in accordance with an exemplary embodiment of the present invention.

FIG. 3 depicts a flowchart depicting operations for executing a security system for a no-interrupted payment card authentication system for computing environment 100, in accordance with an illustrative embodiment of the present invention. More specifically, FIG. 3, depicts combined overall operations, 300, of NTCCAM program 122 (executing on institution 120). In some embodiments, operations 300 represents logical operations of NTCCAM program 122, wherein interactions between NTCCAM program 122 of institution 120, client application 132 of client device 130, and server application 144 of server system 140 represents logical units executing on institution 120. Further, operations 300 can include a portion or all of combined overall operations of 200. It should be appreciated that FIG. 3 provides an illustration of one implementation and does not imply any limitations with regard to the environments in which different embodiments may be implemented. Many modifications to the depicted environment may be made. In one embodiment of flowchart 300, the series of operations can be performed in any order. In another embodiments, the series of operations, of flowchart 300, can be performed simultaneously. Additionally, the series of operations, in flowchart 300, can be terminated at any operation. In addition to the features previously mentioned, any operations, of flowchart 300, can be resumed at any time.

In operation 302, NTCCAM program 122 executing on institution 120 operates as a well-being monitoring system and monitors various transactions associated with one or more payments card associated with various accounts and the account owners, respectively. In various embodiments, NTCCAM program 122 receives I/O which includes, but is not limited to, transactions from server system 140 and client device 130. In various embodiments of the present invention, NTCCAM program 122 monitors the various transactions, wherein NTCCAM program 122 operates to identify one or more potential security contexts. NTCCAM program 122 further monitors the various transactions to ensure that the safety and security of the various accounts established with institution 120.

In operation 304, NTCCAM program 122 analyzes the various transactions to detect one or more potential security contexts. In various embodiments, NTCCAM program 122 analyzes the various transactions associated with an account (e.g., account A), wherein NTCCAM program 122 analyzes the various transactions to detect suspicious and/or fraudulent activity. In various embodiments suspicious and/or fraudulent activity includes, but is not limited to, purchases made in a foreign location, large withdrawal at a remote location (i.e., that may be far and removed from the account owner's location), login to online account from an unidentified computing device (i.e., not authorized by the account owner), purchases that are not analogous to the account owner's frequent purchases, and lost or stolen payment card reported by account owner.

In various embodiments of the present invention, NTCCAM program 122 based, at least in part, on the analyzation of I/O, NTCCAM program 122 identifies one or more security contexts that are associated with, at least, one payment card associated with, at least, one account (operation 306). The present invention recognizes that one or more accounts owned by various accounts owners are established with institution 120, and the present invention further recognizes that NTCCAM program 122 analyzes any and all of the transactions associated with the one or more established accounts and identifies one or more security contexts associated with any of the established accounts. In some embodiments, based, at least on the identification of one or more security contexts associated with, at least, one account, NTCCAM program 122 further analyzes the one or more security contexts to determine whether elevating the security level of the, at least, one payment card associated with, at least, one account.

If NTCCAM program 122 determines that the security level of an account should be elevated from normal security level to heightened security level based, at least in part, on the identification of one or more security contexts (decision 308, YES branch), NTCCAM program 122 executes a security response and elevates the security level of the compromised account. If NTCCAN program 122 determines the security level of an account should not be elevated based, at least in part, on the identification of the one or more security contexts (decision 308, NO branch), NTCCAM program 122 does not execute a security response and does not elevate the security level of the account and continues to monitor the various transactions associated with one or more accounts.

In operation 310, NTCCAM program 122 based, at least in part, on the execution of a security response, generates a temporary Cpin associated with, at least, one payment card associated with the compromised account. Additionally, NTCCAM program 122 communicates the security response to the account owner (e.g., user of client device 130) through the established dedicated channel of the account. In various embodiments, NTCCAM program 122 communicates, at least, one temporary Cpin to the account owner through the established dedicated channel. NTCCAM program 122 communicates the, at least, one temporary Cpin with instructions to client application 132 (e.g., established dedicated channel) with program instructions instructing client application 132 to populate the Cpin and instructions on client interface 134 for the account owner.

Figure 4:
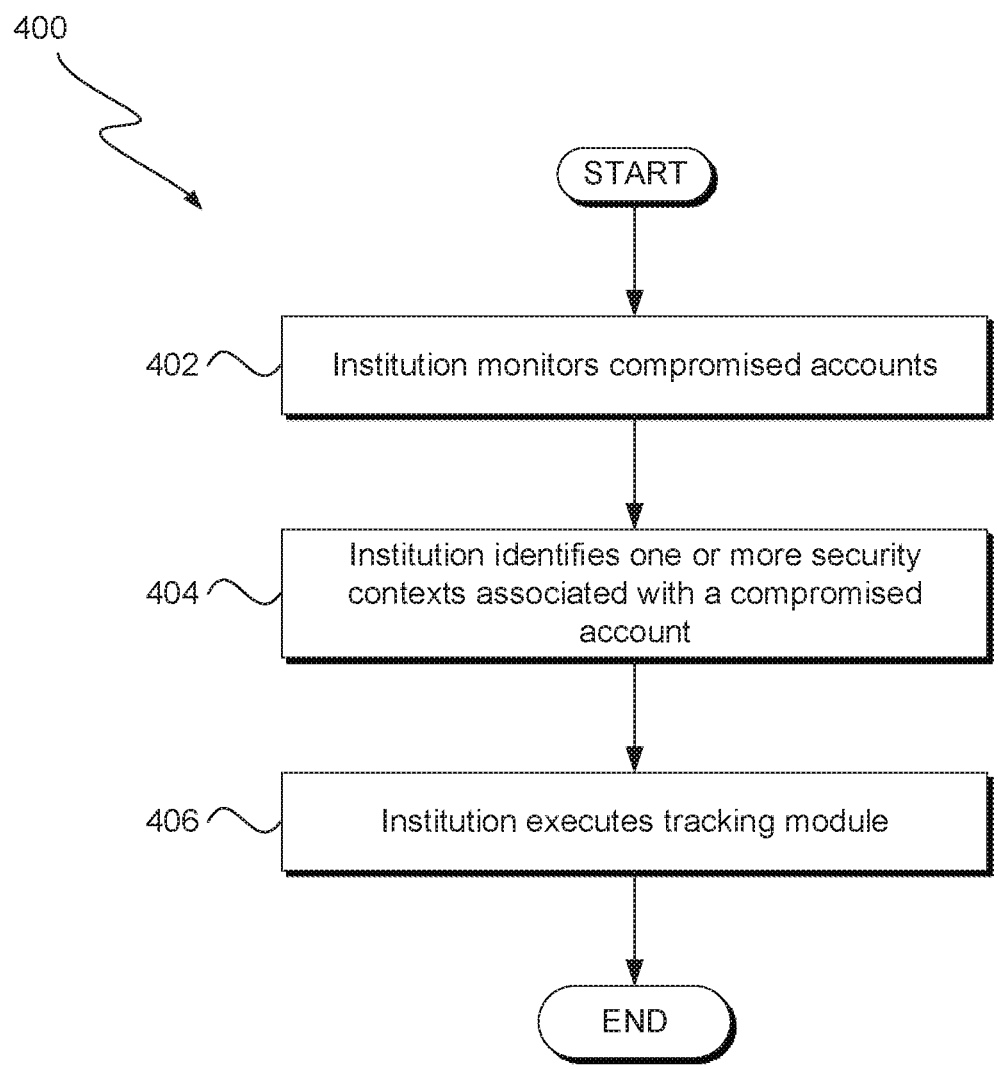
FIG. 4 illustrates operational processes of a system for a payment card to execute a tracking module, on a computing device within the environment of FIG. 1, in accordance with an exemplary embodiment of the present invention.

FIG. 4 depicts flowchart depicting operations for a tracking module of a compromised account for computing environment 100, in accordance with an illustrative embodiment of the present invention. More specifically, FIG. 4, depicts combined overall operations, 400, of NTCCAM program 122 (executing on institution 120). In some embodiments, operations 300 represents logical operations of NTCCAM program 122, wherein interactions between NTCCAM program 122 of institution 120, client application 132 of client device 130, and server application 144 of server system 140 represents logical units executing on institution 120. Further, operations 400 can include a portion or all of combined overall operations of 300 and operations 200. In various embodiments, the series of operations 400, can be performed at the conclusion of operations 300 and/or operations 200. In some embodiments, operations 400, can be performed simultaneously with operations 300 and/or operations 200. It should be appreciated that FIG. 4 provides an illustration of one implementation and does not imply any limitations with regard to the environments in which different embodiments may be implemented. Many modifications to the depicted environment may be made. In one embodiment, the series of operations, of flowchart 400, can be performed simultaneously. Additionally, the series of operations, in flowchart 400, can be terminated at any operation. In addition to the features previously mentioned, any operations of flowchart 400, can be resumed at any time.

In operation 402, NTCCAM program 122 continuously monitors various compromised accounts based, at least in part, on the identification of one or more compromised accounts, as discussed above. In various embodiments, NTCCAM program 122 monitors one or more compromised accounts to detect additional security contexts based, at least in part, on the previously identified one or more security contexts. In various embodiments, NTCCAM program 122 continuously monitors one or more payments cards associated with various compromised accounts to determine whether suspicious activity on the, at least, one payment card while the security level of the one payment card has been elevated to heightened security level.

In operation 404, NTCCAM program 122 receives various transactions associated with one or more payments cards of various compromised accounts and analyzes the various transactions for one or more security contexts, as discussed above. In various embodiments, NTCCAM program 122 identifies one or more security contexts associated with various transactions connected with one or more payment cards of various compromised accounts. Based, at least in part, on the identification of one or more security contexts associated with various transactions connected with one or more payment cards of various compromised accounts, NTCCAM program 122 generates an additional security response and communicates this additional security response through an established dedicated channel to client application 132 with program instructions instructing client application 132 to notify the account owner by populating the additional security response on client interface 134. Additionally, NTCCAM program 122 generates, at least, a second temporary Cpin associated with, at least, one payment card of the compromised account. NTCCAM program 122 communicates the, at least, second temporary Cpin through the established dedicated channel to client application 132 with program instructions instructing client application 132 to communicate the, at least, second temporary Cpin to the account owner by populating the second temporary Cpin on client interface 134. In response to NTCCAM program 122 generating, at least, a second temporary Cpin, NTCCAM program 122 revokes the use of the first temporary Cpin and allows the account owner to utilize the second temporary Cpin to facilitate transactions with the, at least, one payment card of the compromised account.

In operation 406, NTCCAM program 122 executes a tracking module based, at least in part, on the identification of additional security response associated with one or more security contexts. In various embodiments, the tracking module is executed by NTCCAM program 122 that tracks the progression and the pathway of an unknown user of a payment card associated with a compromised account. In some embodiments, the tracking module retrieves data that is associated with (i) the amount of money spent on one or more transactions, (ii) the product or service of the one or more transactions, and (iii) the various locations of the one or more transactions. In some embodiments, NTCCAM program 122 utilizes the retrieved data associated with the payment card to predict the location in which the unknown user will transact next with the payment card associated with the compromised account. In some embodiments, NTCCAM program 122 communicates an alert to an employee or registered official of institution 120. Additionally, in some embodiments, NTCCAM program 122 in response to predicting the location in which the unknown user will transact next with the payment card associated with the compromised account, communicates this information with local authorities (e.g., police). In various embodiments, NTCCAM program 122 stores the data associated with the tracking module for subsequent use by the account owner, an employee or registered official of institution 120, the authorities (i.e., local police, federal police, etc.), etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
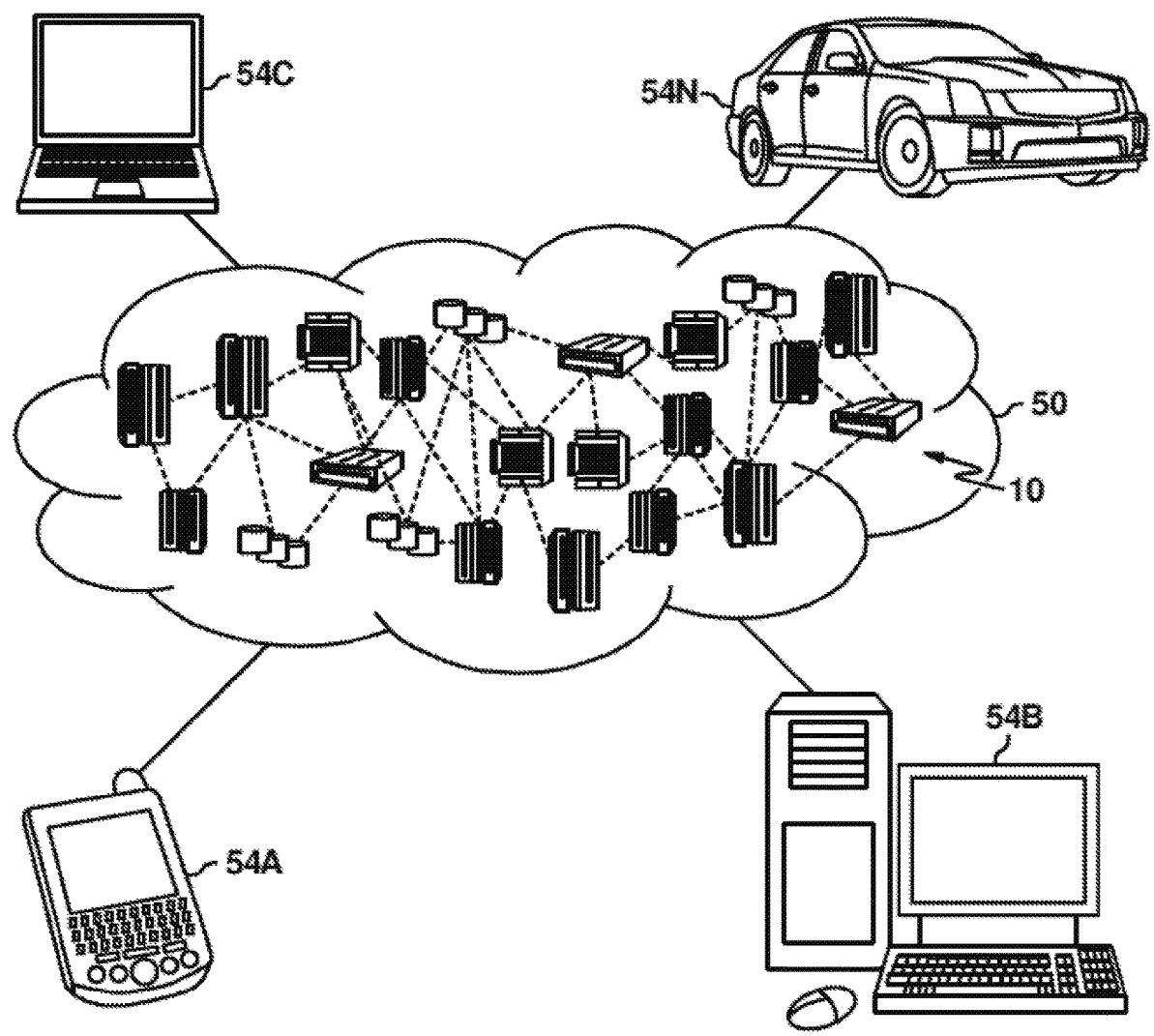
FIG. 5 depicts a cloud computing environment according to at least one embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
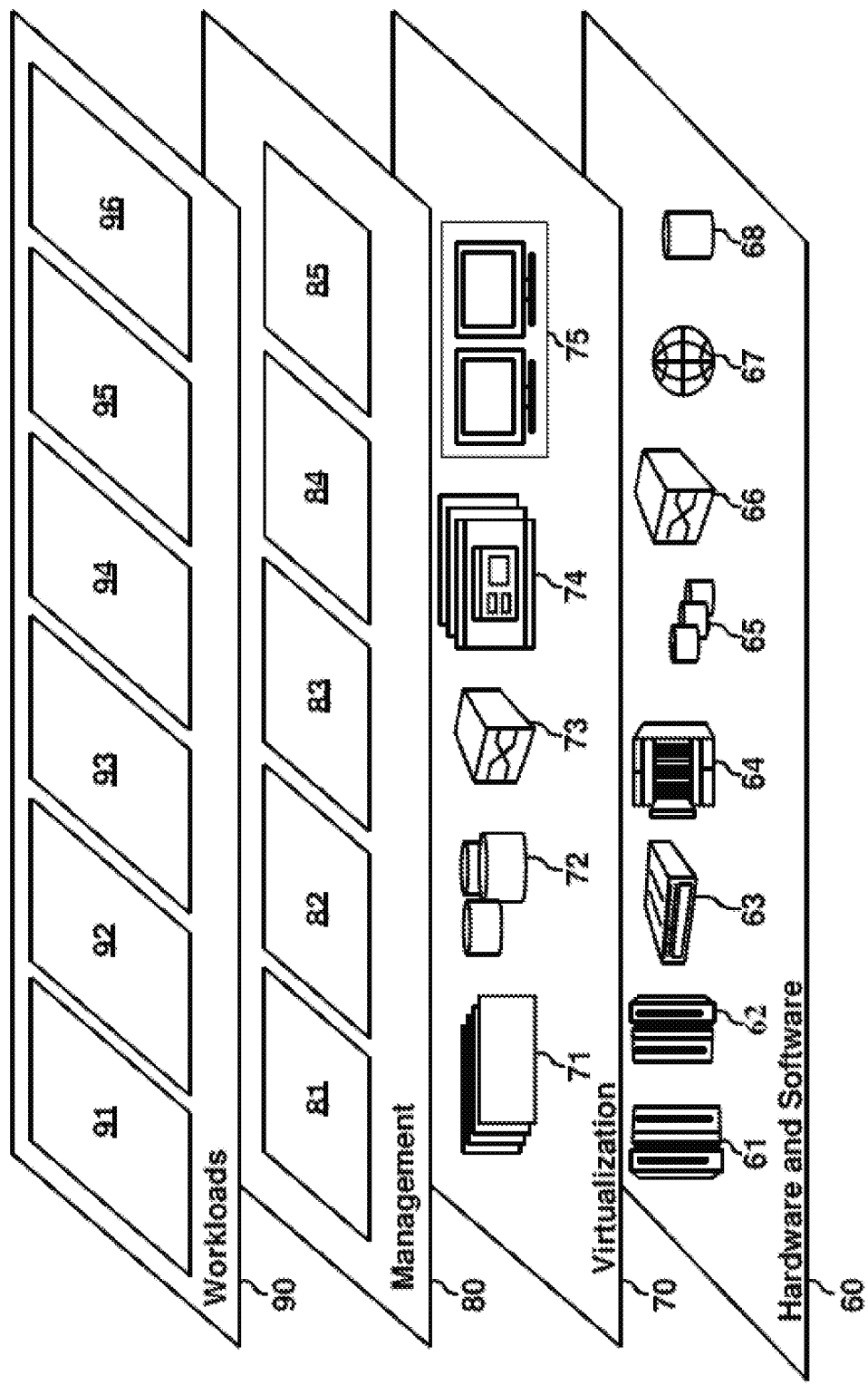
FIG. 6 depicts abstraction model layers according to at least on embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 7:
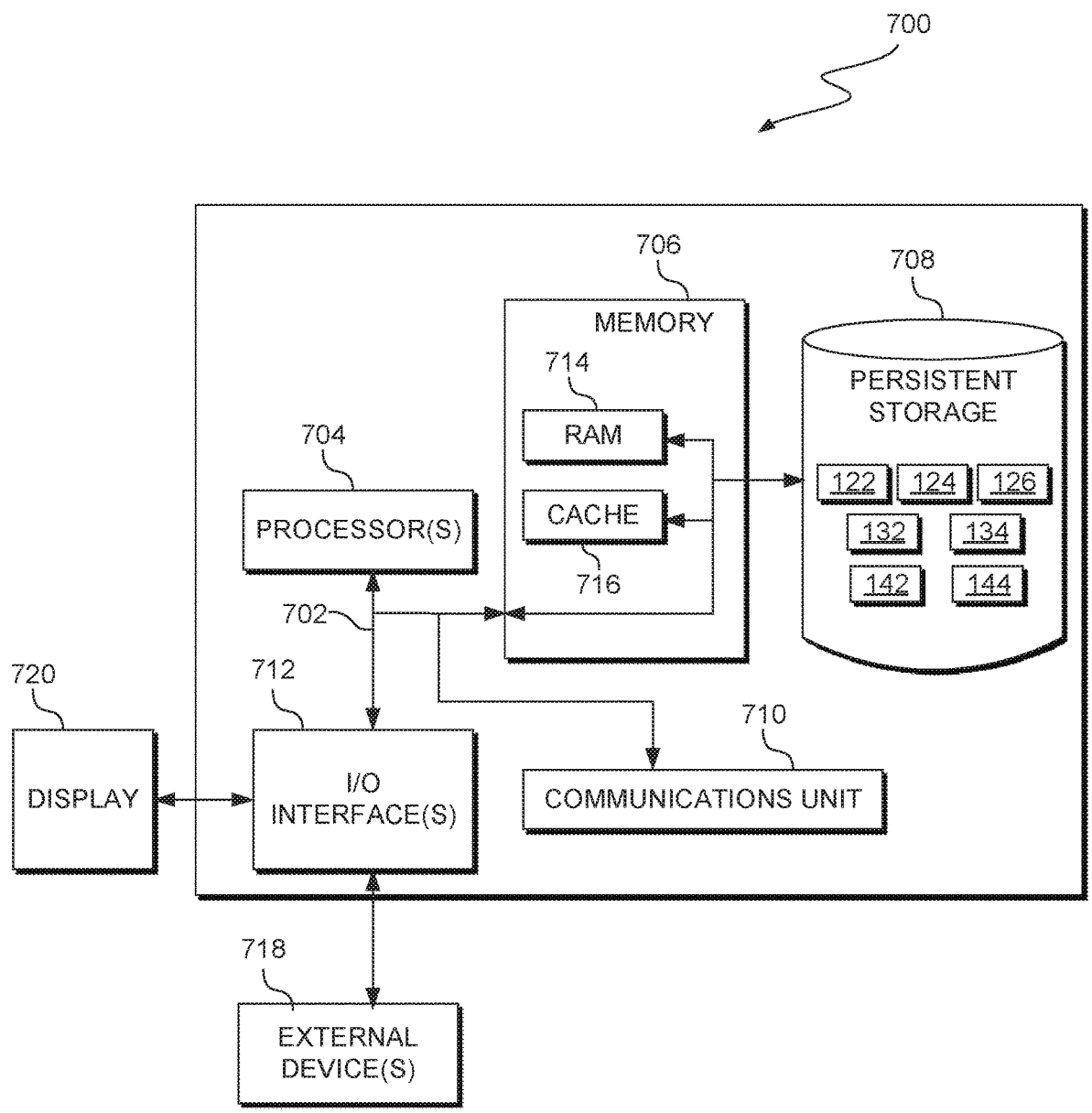
FIG. 7 depicts a block diagram of components of one or more computing devices within the computing environment depicted in FIG. 1, in accordance with an exemplary embodiment of the present invention.

FIG. 7 depicts a block diagram, 700, of components of institution 120, client device 130, and server system 140, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Institution 120, client device 130, and server system 140 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

NTCCAM program 122, computer interface 124, database 126, client application 132, client interface 134, database 142, and server application 144 are stored in persistent storage 708 for execution and/or access by one or more of the respective computer processor(s) 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 110. In these examples, communications unit 710 includes one or more network interface cards. Communications unit 710 may provide communications through the use of either or both physical and wireless communications links. NTCCAM program 122, computer interface 124, database 126, client application 132, client interface 134, database 142, and server application 144 may be downloaded to persistent storage 708 through communications unit 710.

I/O interface(s) 712 allows for input and output of data with other devices that may be connected to institution 120, client device 130, and server system 140. For example, I/O interface(s) 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., NTCCAM program 122, computer interface 124, database 126, client application 132, client interface 134, database 142, and server application 144, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method for executing an encrypted access policy, the method comprising:
    identifying, by one or more processors, a payment card authentication management request associated with an account, where the payment card authentication management request includes: (i) one or more payment cards, and (ii) one or more security contexts associated with the one or more payment cards;
    monitoring, by one or more processors, one or more transactions associated with the account to detect one or more of the security contexts associated with one or more of the payment cards;
    determining, by one or more processors, to elevate a security level associated with the account based, at least in part, on the detection of the one or more of the security contexts; and
    generating, by one or more processors, at least one temporary personal identification number based, at least in part, on the determination to elevate the security level associated with the account;
    establishing, by one or more processors, a dedicated channel connected to an authorized computing device associated with the account;
    communicating, by one or more processors, the at least one temporary personal identification number to the authorized computing device through the dedicated channel; and
    instructing, by one or more computer processors, the authorized computing device to utilize the at least one temporary personal identification number for one or more authorized transactions until a new payment card is issued to the user.

2. The computer-implemented method of claim 1, the method further comprising:
    in response to communicating the at least one temporary personal identification number to the authorized computing device through the dedicated channel, authorizing, by one or more processors, one or more transactions utilizing the temporary personal identification number.

3. The computer-implemented method of claim 1, the method further comprising:
    based, at least in part, on the detection of the one or more security contexts, executing, by the one or more processors, a tracking module associated with (i) the account and (ii) the one or more of the payment cards;
    identifying, by one or more processors, utilizing the tracking module, data relating to the one or more security contexts; and
    predicting, by one or more processors, a location of a future fraudulent transaction based, at least in part, on the identified data relating to the one or more security contexts.

4. The computer-implemented method of claim 1, the method further comprising:
    receiving, by one or more processors, an activation request from the authorized computing device to authenticate a new payment card; and
    communicating, by one or more processors, to the authorized computing device, a notification that includes: (i) an indication that the new payment card has been authenticated, and (ii) an instruction to discontinue use of the at least one temporary personal identification number.

5. The computer-implemented method of claim 1, the method further comprising:
    executing, by one or more computer processors, a security response for the associated account, wherein the associated account is a compromised account.

6. The computer-implemented method of claim 1, the method further comprising:
    elevating, by one or more computer processors, the security level of the associated account, wherein the associated account is a compromised account.

7. The computer-implemented method of claim 1, the method further comprising:
    monitoring, by one or more computer processors, one or more payment cards associated with the associated account to track suspicious activity on at least one of the one or more payment cards while the security level of the associated account has been elevated, wherein the associated account is a compromised account.

8. The computer-implemented method of claim 1, the method further comprising:
    tracking, by one or more computer processors, a progression and a physical pathway of an unknown user of one or more payment cards associated with the associated account, wherein the associated account is a compromised account.

9. A computer program product for executing an encrypted access policy, the computer program product comprising:
    one or more computer-readable storage media and program instructions stored on the one or more computer-readable storage media, the stored program instructions comprising:
    program instructions to identify a payment card authentication management request associated with an account, where the payment card authentication management request includes: (i) one or more payment cards, and (ii) one or more security contexts associated with the one or more payment cards;
    program instructions to monitor one or more transactions associated with the account to detect one or more of the security contexts associated with one or more of the payment cards;

program instructions to determine to elevate a security level associated with the account based, at least in part, on the detection of the one or more of the security contexts; and program instructions to generate at least one temporary personal identification number based, at least in part, on the determination to elevate the security level associated with the account;

program instructions to establish a dedicated channel connected to an authorized computing device associated with the account;

program instructions to communicate the at least one temporary personal identification number to the authorized computing device through the dedicated channel; and program instructions to instruct the authorized computing device to utilize the at least one temporary personal identification number for one or more authorized transactions until a new payment card is issued to the user.

10. The computer program product of claim 9, the stored program instructions further comprising:

program instructions to, in response to communicating the temporary personal identification number to the authorized computing device utilizing the dedicated channel, authorize one or the more transactions utilizing the temporary personal identification number.

11. The computer program product of claim 9, the stored program instruction further comprising:

program instructions to execute a tracking module associated with (i) the account and (ii) the payment card;

program instructions to identify data relating to the one or more security contexts associated with one or more fraudulent transactions; and program instructions to predict a location in which at least an additional fraudulent transaction will occur and communicating an alert to an employee or registered official of an institution for the account.

12. The computer program product of claim 9, the stored program instructions further comprising:

program instructions to receive an activation request from the authorized computing device to authenticate a new payment card; and program instructions to communicate, to the authorized computing device, a notification that includes: (i) an indication that the new payment card has been authenticated, and (ii) an instruction to discontinue use of the at least one temporary personal identification number.

13. The computer program product of claim 9, the stored program instructions further comprising:

program instructions to execute a security response for the associated account, wherein the associated account is a compromised account.

14. The computer program product of claim 9, the stored program instructions further comprising:

program instructions to elevate the security level of the associated account, wherein the associated account is a compromised account.

15. The computer program product of claim 9, the stored program instructions further comprising:

program instructions to monitor one or more payment cards associated with the associated account to track suspicious activity on at least one of the one or more payment cards while the security level of the associated account has been elevated, wherein the associated account is a compromised account.

16. The computer program product of claim 9, the stored program instructions further comprising:

program instructions to track a progression and a physical pathway of an unknown user of one or more payment cards associated with the associated account, wherein the associated account is a compromised account.

17. A computer system for executing an encrypted access policy, the computer system comprising:

one or more computer processors;

one or more computer readable storage medium; and program instructions stored on the computer readable storage medium for execution by at least one of the one or more processors, the stored program instructions comprising:

program instructions to identify a payment card authentication management request associated with an account, where the payment card authentication management request includes: (i) one or more payment cards, and (ii) one or more security contexts associated with the one or more payment cards;

program instructions to monitor one or more transactions associated with the account to detect one or more of the security contexts associated with one or more of the payment cards;

program instructions to determine to elevate a security level associated with the account based, at least in part, on the detection of the one or more of the security contexts; and program instructions to generate at least one temporary personal identification number based, at least in part, on the determination to elevate the security level associated with the account;

program instructions to establish a dedicated channel connected to an authorized computing device associated with the account;

program instructions to communicate the at least one temporary personal identification number to the authorized computing device through the dedicated channel; and program instructions to instruct the authorized computing device to utilize the at least one temporary personal identification number for one or more authorized transactions until a new payment card is issued to the user.

18. The computer system of claim 17, the stored program instructions further comprising:

program instructions to execute a tracking module associated with (i) the account and (ii) the payment card;

program instructions to identify data relating to the one or more security contexts associated with one or more fraudulent transactions; and program instructions to predict a location in which at least an additional fraudulent transaction will occur and communicating an alert to an employee or registered official of an institution for the account.

19. The computer system of claim 17, the stored program instructions further comprising:

program instructions to receive an activation request from the authorized computing device to authenticate a new payment card; and program instructions to communicate, to the authorized computing device, a notification that includes: (i) an indication that the new payment card has been authenticated, and (ii) an instruction to discontinue use of the at least one temporary personal identification number.

20. The computer system of claim 17, the stored program instructions further comprising:

program instructions to monitor one or more payment cards associated with the associated account to track suspicious activity on at least one of the one or more payment cards while the security level of the associated account has been elevated, wherein the associated account is a compromised account.

\* \* \* \* \*